& Samuels

United States Patent [19]
Salter, Jr.

[11] 4,191,042
[45] Mar. 4, 1980

[54] HEAVY DUTY AXIAL ADJUSTMENT MECHANISM FOR ROLLING MILL ROLLS

[75] Inventor: Lowell S. Salter, Jr., Shrewsbury, Mass.

[73] Assignee: Morgan Construction Company, Worcester, Mass.

[21] Appl. No.: 930,748

[22] Filed: Aug. 3, 1978

[51] Int. Cl.$^2$ .............................................. B21B 31/18
[52] U.S. Cl. ..................................................... 72/247
[58] Field of Search ................................... 72/247, 237

[56] References Cited
U.S. PATENT DOCUMENTS

| | | | |
|---|---|---|---|
| 2,774,263 | 12/1956 | Leafren | 72/247 X |
| 3,987,657 | 10/1976 | Properzi | 72/247 |

FOREIGN PATENT DOCUMENTS 889062  2/1962  United Kingdom ...................... 72/247

Primary Examiner—Milton S. Mehr
Attorney, Agent, or Firm—Thompson, Birch, Gauthier

[57] ABSTRACT

A heavy duty axial adjustment mechanism for a rolling mill roll neck which is rotatably supported in a radial bearing contained in a chock. A rolling element thrust bearing has its inner race fixed axially in relation to the roll neck. The outer thrust bearing race is axially confined between separable retainer components which are interconnected by fasteners. The retainer components each have external adjusting threads in engagement with internal adjusting threads on the chock. Rotation of the interconnected retainer components imparts axial adjustments to the roll neck relative to the chock without subjecting the fasteners to damaging thrust forces.

5 Claims, 2 Drawing Figures

HEAVY DUTY AXIAL ADJUSTMENT MECHANISM FOR ROLLING MILL ROLLS

TECHNICAL FIELD

This invention relates generally to rolling mills wherein the work rolls have roll necks rotatably supported in radial bearings contained in chocks, and is concerned in particular with an improved heavy duty mechanism for axially adjusting the work rolls.

BACKGROUND OF THE PRIOR ART

Axial roll adjustment capability has proven advantages for many rolling mill bearing applications. However, there is only limited space available for accommodating the axial adjustment mechanisms. This is because of limitations imposed on the external chock dimensions by the roll barrel diameters, and the need to accommodate roll neck diameters large enough to handle the rolling forces. Because space is limited, many of the axial adjustment thrust components and their connection screws are reduced in size to the point where some become highly stressed during mill operation. Screw loosenings and failures have been experienced on many bearing applications when the inevitable thrust overloads occur during rolling, and these problems in turn have caused expensive bearing damage and mill down time.

BRIEF SUMMARY OF THE INVENTION

The present invention eliminates the above problems by effectively isolating connecting screws in the adjustment mechanism from dangerous stresses.

While it is to be understood that the present invention is applicable to roll necks journalled in either rolling element bearings or oil film bearings, a preferred embodiment will hereinafter be described in greater detail in connection with a conventional rolling mill oil film bearing assembly where the roll neck has a sleeve detachably fixed thereto and journalled for rotation in a bushing contained in the bearing chock. Axial adjustment is imparted to the roll neck via a rolling element thrust bearing having its inner race axially fixed in relation to both the sleeve and the roll neck. The outer thrust bearing race is axially confined between two separable retainer components which are interconnected by fasteners. The retainer components are each externally provided with heavy duty adjusting threads in engagement with internal heavy duty adjusting threads on the bearing chock. An operating means is associated with the interconnected retainer components to impart rotation thereto. Axial adjustments are thus imparted to the roll neck due to the interaction of the adjusting threads and the thrust path established between the chock, retainer components, thrust bearing and neck sleeve. Thrust loads are transmitted directly through the heavy duty adjusting threads without exposing the fasteners to damaging stresses.

Preferably the fasteners will comprise a plurality of shoulder screws extending between the retainer components, each screw having a head at one end acting on one retainer component and having its opposite end threadedly engaged with the other retainer component. Preferably, the clearance between the heavy duty adjusting threads is less than that which would result in plastic deformation of the shoulder screws. Alternatively, resilient means in the form of compression springs may be interposed between the heads of the shoulder screws and the said one retainer component.

DETAILED DESCRIPTION OF THE INVENTION

Figure 1:
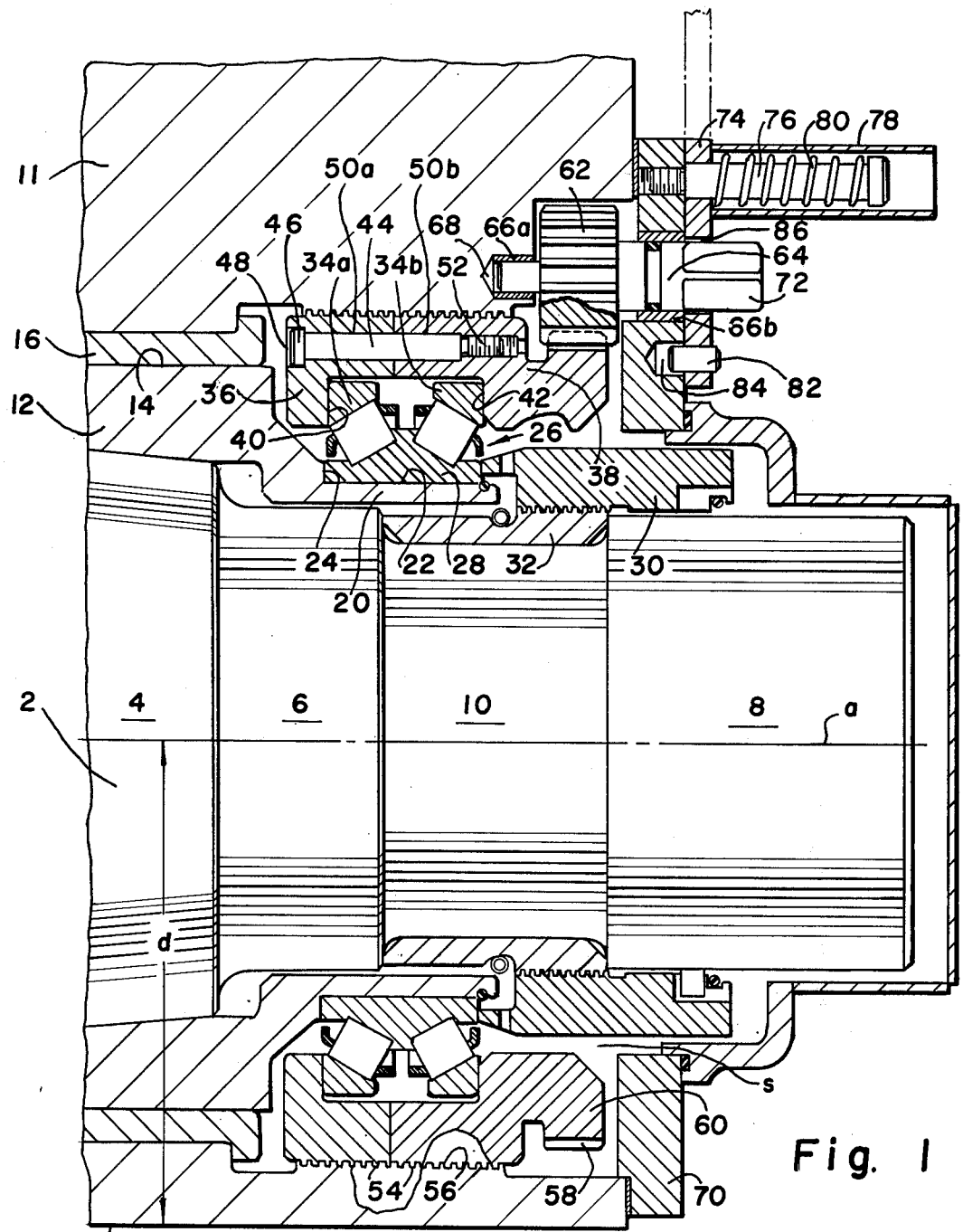
FIG. 1 is a cross-sectional view taken through the end portion of a rolling mill oil film bearing assembly incorporating a preferred embodiment of the axial adjustment mechanism in accordance with the present invention.

A preferred embodiment of the invention is shown in FIG. 1, wherein a roll neck 2 is shown having a tapered section 4 and cylindrical sections 6 and 8 separated by a wide groove 10.

The roll neck together with its radial bearing and axial adjustment components (to be hereinafter described) are internally housed in a bearing chock 11. The internal space "s" available for accommodating these components is limited by a combination of several factors. For example, the dimension "d" from the roll axis "a" to the chock surface 11a cannot be greater than the radius of the roll barrel (not shown), for otherwise the chocks may interfere with each other when the rolls are adjusted to a minimum roll parting. Also, the roll neck diameters at 4, 6 and 8 must be large enough to handle the rolling loads. Thus, the space "s" is more often than not at a premium, particularly where the bearing components are subjected to heavy thrust loads.

The tapered section 4 has a sleeve 12 detachably fixed thereto by conventional means (not shown). The sleeve 12 has a tapered bore and a cylindrical exterior surface 14 which is journalled for rotation in a bushing 16 fixed within the bearing chock 11. Conventional means (not shown) are employed to maintain a film of oil between the sleeve 12 and bushing 16 during operation of the mill. The sleeve 12 has a cylindrical extension 20 surrounding roll neck section 6 and a portion of the groove 10. The extension 20 is externally grooved as at 22, forming a shoulder 24. A rolling element thrust bearing assembly 26 is mounted on the cylindrical extension 20. The inner thrust bearing race 28 is seated in the groove 22 and is held in a fixed position against the shoulder 24 by means of a locknut 30 threaded onto a split ring 32 fitted in the groove 10.

The outer thrust bearing race consists of axially separated elements 34a, 34b axially confined between two retainer components 36 and 38. The retainer components are provided respectively with internal shoulders 40, 42 acting in opposite directions respectively on the outer thrust bearing elements 34a, 34b. The retainer components are held together by fasteners which preferably will comprise a plurality of shoulder screws 44. Each shoulder screw has a head 46 at one end received in a counter bore 48 in retainer component 36. The shoulder screws have unthreaded shank portions extending through aligned bores 50a, 50b in the retainer components 36, 38 respectively. The opposite ends of the shoulder screws are threadedly engaged as at 52 in the bores 50b.

The retainer components 36, 38 are each provided with heavy external adjusting threads 54 which engage corresponding heavy internal adjusting threads 56 cut into the chock 11. The connecting shoulder screws 44 serve the dual function of axially retaining the two retainer components 36, 38 before and during assembly in the bearing chock and of aligning the retainer components radially so that their external adjusting threads 54 are held in correct relationship.

The operating means employed to impart rotation to the interconnected retainer components includes gear teeth 58 integrally formed on an outboard extension 60 of component 38. The gear teeth 58 mesh with a small diameter spur gear 62 carried on a short stub shaft 64 journalled between bearings 66a, 66b. Bearing 66a is located in a bore 68 in the chock 11, and bearing 66b is located in an aligned bore in an external cover plate 70 fixed to the chock by appropriate means (not shown). The squared exposed end 72 of stub shaft 64 may be conveniently rotated by a wrench or other like tool. During operation of the mill, the stub shaft 64 is prevented from rotating by a locking mechanism which includes a locking plate 74 rotatable about a pin 76 having one end threaded into the cover plate 70. The pin extends axially into a handle 78 fixed to the locking plate, the latter being resiliently held against the chock 11 by a coiled spring 80. The locking plate 74 carries a pin 82 arranged to be received in a hole 84 in the cover plate 70. The locking plate 74 has a squared aperture 86 which interlocks with the squared end 72 of the stub shaft 64.

Figure 2:
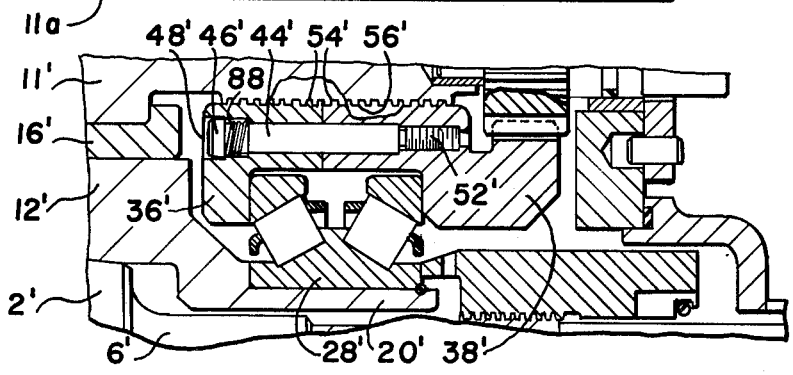
FIG. 2 is a fragmentary sectional view showing an alternate embodiment of the invention.

In FIG. 2, which discloses an alternate embodiment of the invention, like components have been designed with prime reference numbers. In this embodiment, compression springs 88 are interposed between the heads 46' of the shoulder screws 44' and the bottoms of the counterbores 48'. The compression springs 88 provide a safeguard against the overstressing of the shoulder screws 44' in cases where the thread clearance between adjusting threads 54', 56' is too great to be accommodated by normal shoulder screw stretch.

With reference to FIG. 1, when an axial adjustment of the roll neck 2 is required, an operator first grasps and pulls handle 78 sufficiently to disengage pin 82 from hole 84 and to withdraw the squared aperture 86 in locking plate 74 from the squared end 72 of the stub shaft 64. The locking plate 74 is then rotated about the axis of pin 76 to an inoperative position partially illustrated by the dot-dash lines. The stub shaft 64 is then rotated by applying a wrench or other appropriate tool to the squared end 72. This causes gear 62 to rotate. Gear 62 is meshed with the teeth 58 on retainer component 38, and the retainer components 36 and 38 are interconnected by the shoulder screws 44. Both retainer components 36, 38 have external adjusting threads 54 in engagement with internal adjustment threads 56 on the chock 11. Accordingly, rotation of stub shaft 64 will impart axial movement to the interconnected retainer components 36, 38. This axial movement will be transmitted to the roll neck 2 via the thrust bearing assembly 26 and the sleeve 12 of the oil film bearing. Thrust forces will be transmitted to the bearing chock through the adjusting threads 54, 56 and not through the shoulder screws 44. Hence, the likelihood that the shoulder screws will undergo dangerous overstressing and/or loosening during mill operation is markedly reduced. However, in the unlikely event that the shoulder screws 44 should loosen or break, their complete disengagement from the bores 50a, 50b will be prevented by the screw heads 46 coming into contact with the end of bushing 16. Thus, the screws will continue to maintain the retainer components 36, 38 in proper alignment, and no bearing damage will result.

I claim:

1. In a bearing assembly for a rolling mill roll neck, wherein axial adjustments are imparted to the roll relative to the bearing chock via a rolling element thrust bearing having its inner race axially fixed in relation to the roll neck, apparatus cooperatively associated with the outer thrust bearing race for axially adjusting the roll in relation to the bearing chock, comprising: retainer means for axially confining said outer thrust bearing race, said retainer means consisting of two separable components interconnected by fastening means received in aligned openings in said components, said separable components each having external threads in engagement with internal threads on the bearing chock, and operating means associated with at least one of said components for imparting rotation thereto.

2. The apparatus as claimed in claim 1 wherein said fastening means is comprised of a plurality of screws extending between said components, each of said screws having a head at one end acting on one of said components and having its opposite end threadedly engaged with the other of said components.

3. The apparatus as claimed in claim 2 wherein the clearance between the external threads on said components and the internal threads on said bearing chock is less than that which would result in plastic deformation of said screws.

4. the apparatus as claimed in claim 2 wherein the heads on said screws are received in counter bores in said one component, and wherein compression springs are interposed between said heads and the bottoms of said counter bores.

5. The apparatus as claimed in claim 1 wherein said operating means is comprised of gear teeth on one of said components in meshed relationship with a spur gear, and means operable externally of the bearing chock for rotating said spur gear.

* * * * *